US012216552B2

(12) United States Patent
Lin et al.

(10) Patent No.: US 12,216,552 B2
(45) Date of Patent: Feb. 4, 2025

(54) MULTI-PHASE CLOUD SERVICE NODE ERROR PREDICTION BASED ON MINIMIZATION FUNCTION WITH COST RATIO AND FALSE POSITIVE DETECTION

(71) Applicant: Microsoft Technology Licensing, LLC, Redmond, WA (US)

(72) Inventors: Qingwei Lin, Beijing (CN); Kaixin Sui, Beijing (CN); Yong Xu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 901 days.

(21) Appl. No.: 17/056,744

(22) PCT Filed: Jun. 29, 2018

(86) PCT No.: PCT/CN2018/093775
§ 371 (c)(1),
(2) Date: Nov. 18, 2020

(87) PCT Pub. No.: WO2020/000405
PCT Pub. Date: Jan. 2, 2020

(65) Prior Publication Data
US 2021/0208983 A1 Jul. 8, 2021

(51) Int. Cl.
*G06F 11/14* (2006.01)
*G06F 9/455* (2018.01)
(Continued)

(52) U.S. Cl.
CPC ...... *G06F 11/1484* (2013.01); *G06F 9/45558* (2013.01); *G06F 9/4856* (2013.01);
(Continued)

(58) Field of Classification Search
None
See application file for complete search history.

(56) References Cited

U.S. PATENT DOCUMENTS 8,332,348 B1 12/2012 Avery
9,400,731 B1 7/2016 Preece
(Continued)

FOREIGN PATENT DOCUMENTS

CN 101467188 A 6/2009
CN 102932419 A 2/2013
(Continued)

OTHER PUBLICATIONS

"Office Action and Search Report Issued in Chinese Patent Application No. 201880094684.2", (w/ English Translation), Mailed Date: Jan. 30, 2022, 11 Pages.
(Continued)

*Primary Examiner* — Meng Ai T An
*Assistant Examiner* — Zujia Xu
(74) *Attorney, Agent, or Firm* — Schwegman Lundberg & Woessner, P.A.

(57) ABSTRACT

Systems and techniques for multi-phase cloud service node error prediction are described herein. A set of spatial metrics and a set of temporal metrics may be obtained for node devices in a cloud computing platform. The node devices may be evaluated using a spatial machine learning model and a temporal machine learning model to create a spatial output and a temporal output. One or more potentially faulty nodes may be determined based on an evaluation of the spatial output and the temporal output using a ranking model. The one or more potentially faulty nodes may be a subset of the node devices. One or more migration source nodes may be identified from one or more potentially faulty nodes. The one or more migration source nodes may be identified by minimization of a cost of false positive and false negative node detection.

20 Claims, 6 Drawing Sheets

(51) Int. Cl.
G06F 9/48 (2006.01)
G06F 9/50 (2006.01)
G06N 5/01 (2023.01)

(52) U.S. Cl.
CPC .......... *G06F 9/5072* (2013.01); *G06F 11/142* (2013.01); *G06N 5/01* (2023.01); *G06F 2009/45562* (2013.01); *G06F 2009/4557* (2013.01); *G06F 2009/45591* (2013.01)

(56) References Cited

U.S. PATENT DOCUMENTS

| | | | |
|---|---|---|---|
| 9,813,379 | B1 | 11/2017 | Shevade et al. |
| 10,360,482 | B1* | 7/2019 | Khare ................... G06N 3/04 |
| 10,613,962 | B1* | 4/2020 | Delange .............. G06F 11/3006 |
| 10,769,007 | B2 | 9/2020 | Chintalapati et al. |
| 2004/0003319 | A1 | 1/2004 | Ukai et al. |
| 2004/0073855 | A1* | 4/2004 | Maxwell ................. H04M 3/30 714/724 |
| 2007/0250270 | A1* | 10/2007 | Vaisberg ............ G01N 33/5014 702/19 |
| 2010/0318837 | A1* | 12/2010 | Murphy .............. G06F 11/1461 714/E11.125 |
| 2012/0203888 | A1 | 8/2012 | Balakrishnan et al. |
| 2013/0117448 | A1 | 5/2013 | Nahum et al. |
| 2014/0178084 | A1* | 6/2014 | Kuo ....................... G03G 15/55 399/38 |
| 2015/0135012 | A1 | 5/2015 | Bhalla et al. |
| 2015/0269486 | A1* | 9/2015 | Paxton ................... G06N 99/00 706/56 |
| 2016/0196175 | A1 | 7/2016 | Kasahara et al. |
| 2016/0275648 | A1 | 9/2016 | Honda et al. |
| 2016/0306675 | A1 | 10/2016 | Wiggers et al. |
| 2016/0306727 | A1* | 10/2016 | Kato ................... G06F 11/3447 |
| 2017/0187592 | A1 | 6/2017 | Ghosh et al. |
| 2017/0212815 | A1 | 7/2017 | Yushina |
| 2017/0256158 | A1 | 9/2017 | Kopetz |
| 2017/0344909 | A1 | 11/2017 | Kurokawa et al. |
| 2018/0060192 | A1* | 3/2018 | Eggert ................. G06F 11/3034 |
| 2018/0068554 | A1 | 3/2018 | Naraharisetti et al. |
| 2018/0240011 | A1* | 8/2018 | Tan ........................... G06F 9/46 |
| 2019/0079962 | A1* | 3/2019 | Koepke .................. G06N 20/20 |
| 2019/0155622 | A1* | 5/2019 | Chen ...................... G06N 3/045 |
| 2019/0196920 | A1 | 6/2019 | Andrade Costa et al. |
| 2019/0243672 | A1* | 8/2019 | Yadav .................... G06F 3/0617 |
| 2019/0272553 | A1* | 9/2019 | Saini ................... G06Q 30/0204 |
| 2019/0277913 | A1* | 9/2019 | Honda ................ G01R 31/2894 |

FOREIGN PATENT DOCUMENTS

| | | |
|---|---|---|
| CN | 105677538 A | 6/2016 |
| CN | 106796540 A | 5/2017 |
| CN | 106846742 A | 6/2017 |
| CN | 106969924 A | 7/2017 |
| CN | 107463998 A | 12/2017 |
| CN | 107564231 A | 1/2018 |
| GB | 2508064 A | 5/2014 |
| JP | 2010198410 A | 9/2010 |
| WO | 2015103534 A1 | 7/2015 |
| WO | 2017187207 A1 | 11/2017 |

OTHER PUBLICATIONS

"Notice of Allowance Issued in Chinese Patent Application No. 201880094684.2", Mailed Date: Mar. 22, 2022, 6 Pages.
"Notice of Allowance Issued in European Patent Application No. 18924981.6", Mailed Date: Mar. 16, 2023, 2 Pages.
"Office Action Issued in European Patent Application No. 19736536. 4", Mailed Date: Jul. 28, 2022, 7 Pages.
"Office Action Issued in Indian Patent Application No. 202017053909", Mailed Date: Sep. 19, 2022, 6 Pages.
"Notice of Allowance Issued in European Patent Application No. 18924981.6", Mailed Date: Dec. 2, 2022, 7 Pages.
Aditham, et al., "LSTM-Based Memory Profiling for Predicting Data Attacks in Distributed Big Data Systems", In Proceedings of the IEEE International Parallel and Distributed Processing Symposium Workshops, May 29, 2017, 9 Pages.
Chen, et al., "Failure Prediction of Jobs in Compute Clouds: A Google Cluster Case Study", In Proceedings of the IEEE International Symposium on Software Reliability Engineering Workshops, Nov. 3, 2014, pp. 341-346.
Fadishei, et al., "Job Failure Prediction in Grid Environment Based on Workload Characteristics", In Proceedings of 14th International CSI Computer Conference, Oct. 20, 2009, pp. 329-334.
Hoffmann, et al., "Advanced Failure Prediction in Complex Software Systems", Retrieved From http://citeseerx.ist.psu.edu/viewdoc/download?doi=10.1.1.472.4905&rep=rep1&type=pdf, Apr. 2004, 19 Pages.
Islam, et al., "Predicting Application Failure in Cloud: A Machine Learning Approach", In Proceedings of the IEEE International Conference on Cognitive Computing, Jun. 25, 2017, pp. 24-31.
Khan, et al., "Workload Characterization and Prediction in the Cloud: A Multiple Time Series Approach", In Proceedings of the IEEE Network Operations and Management Symposium, Apr. 16, 2012, pp. 1287-1294.
"Search Report Issued in European Patent Application No. 18924981. 6", Mailed Date: Dec. 21, 2021, 8 Pages.
"Amazon EBS features", Retrieved From https://aws.amazon.com/ebs/features/, Oct. 2017, 12 Pages.
"Azure Disk Storage", Retrieved From https://azure.microsoft.com/en-au/services/storage/disks/, Oct. 23, 2017, 20 Pages.
"Final Office Action Issued in U.S. Appl. No. 16/003,519", Mailed Date: Mar. 5, 2020, 14 Pages.
"Non Final Office Action Issued in U.S. Appl. No. 16/003,519", Mailed Date: Nov. 18, 2019, 14 Pages.
"Notice of Allowance Issued in U.S. Appl. No. 16/003,519", Mailed Date: May 13, 2020, 6 Pages.
Ambros, et al., "Evaluating Defect Prediction Approaches: A Benchmark and an Extensive Comparison", In Proceedings of the Empirical Software Engineering, Aug. 2012, pp. 531-577.
Ameller, et al., "A Survey on Quality Attributes in Service-based Systems", In Proceedings of Software Quality Journal, vol. 24, Issue 2, Jun. 2016, pp. 271-299.
Botezatu, et al., "Predicting Disk Replacement towards Reliable Data Centers", In Proceedings of the 22nd ACM SIGKDD International Conference on Knowledge Discovery and Data Mining, Aug. 13, 2016, pp. 39-48.
Burges, Christopher J., "From Ranknet to Lambdarank to Lambdamart: An Overview", In Microsoft Research Technical Report MSR-TR-2010-82, Jun. 23, 2010, 19 Pages.
Canfora, et al., "Defect Prediction as a Multi-Objective Optimization Problem", In Software Testing, Verification and Reliability, vol. 25, Issue 4, Jun. 2015, pp. 426-459.
Chawla, et al., "SMOTE: Synthetic Minority Over-Sampling Technique", In Journal of the Artificial Intelligence Research, vol. 16, Jun. 1, 2002, pp. 321-357.
Clark, et al., "Live Migration of Virtual Machines", In Proceedings of 2nd Conference on Symposium on Networked Systems Design & Implementation, vol. 2., May 2, 2005, pp. 273-286.
Dinu, et al., "Understanding the Effects and Implications of Compute Node Related Failures in Hadoop", In Proceedings of the 21st International Symposium on High-Performance Parallel and Distributed Computing, Jun. 2012, pp. 187-198.
Fenton, et al., "Quantitative Analysis of Faults and Failures in a Complex Software System", In Proceedings of IEEE Transactions on Software Engineering, vol. 26, Issue 8, Aug. 2000, pp. 797-814.
Ford, et al., "Availability in Globally Distributed Storage Systems", In Proceedings of 9th USENIX Symposium on Operating Systems Design and Implementation, Oct. 4, 2010, 14 Pages.
Friedman, Jerome, "Greedy Function Approximation: A Gradient Boosting Machine", In Journal of the Annals of Statistics, vol. 29, Issue 5, Oct. 2001, pp. 1189-1232.
Gaber, et al., "Predicting HDD Failures from Compound SMART Attributes", In Proceedings of the 10th ACM International Systems and Storage Conference, May 22, 2017, 1 Page.

(56) References Cited

OTHER PUBLICATIONS

Gill, et al., "Understanding Network Failures in Data Centers: Measurement, Analysis, And Implications", In Proceedings of the ACM SIGCOMM Conference, Aug. 15, 2011, pp. 350-361.
Gousios, et al., "Alitheia Core: An Extensible Software Quality Monitoring Platform", In Proceedings of the 31st International Conference on Software Engineering—Formal Research Demonstrations Track, May 2009, pp. 579-582.
Hall, et al., "A Systematic Literature Review on Fault Prediction Performance in Software Engineering", In Journal of the IEEE Transactions on Software Engineering, vol. 38, Issue, 6, Nov. 2012, pp. 1276-1304.
Hochreiter, et al., "Long Short-term Memory", In Journal of Neural Computation, vol. 9, Issue 8, Nov. 15, 1997, pp. 1735-1780.
Huang, et al., "Gray Failure: The Achilles' Heel of Cloud-Scale Systems", In Proceedings of the 16th Workshop on Hot Topics in Operating Systems, May 2017, pp. 150-155.
Jing, et al., "Heterogeneous Cross-Company Defect Prediction by Unified Metric Representation and CCA-Based Transfer Learning", In Proceedings of the 10th Joint Meeting on Foundations of Software Engineering, Aug. 2015, pp. 496-507.
Kim, et al., "Dealing with Noise in Defect Prediction", In Proceedings of the 33rd International Conference on Software Engineering, May 2011, pp. 481-490.
Li, et al., "On Evaluating Commercial Cloud Services: A Systematic Review", In Journal of Systems and Software, vol. 86, Issue 9, Sep. 2013, pp. 2371-2393.
Lin, et al., "Predicting Node Failure in Cloud Service Systems", In Proceedings of the 26th ACM Joint Meeting on European Software Engineering Conference and Symposium on the Foundations of Software Engineering, Nov. 2018, pp. 480-490.
Liu, Tie-Yan, "Learning to Rank for Information Retrieval", In Journal of the Foundations and Trends in Information Retrieval, vol. 3, Issue 3, Mar. 2009, pp. 225-331.
Menzies, et al., "Data Mining Static Code Attributes to Learn Defect Predictors", In Journal of the IEEE Transactions on Software Engineering, vol. 33, Issue 1, Jan. 2007, pp. 2-13.
Zhou, et al., "An Empirical Study on Quality Issues of Production Big Data Platform", In Proceedings of the 37th International Conference on Software Engineering—vol. 2, May 2015, pp. 17-26.
Mistrik, et al., Table of Contents, "Relating System Quality and Software Architecture", In Proceedings of Morgan Kaufmann Publishers Inc, Jul. 2014, 10 Pages.
Nam, et al., "Heterogeneous Defect Prediction", In Journal of the IEEE Transactions on Software Engineering, vol. 44, Issue 9, Jun. 2017, pp. 874-896.
"International Search Report and Written Opinion Issued In PCT Application No. PCT/CN18/093775", Mailed Date: Mar. 27, 2019, 06 Pages.
"International Search Report and Written Opinion Issued in PCT Application No. PCT/US2019/034769", Mailed Date: Jul. 30, 2019, 14 Pages.
Pinheiro, et al., "Failure Trends in a Large Disk Drive Population", In Proceedings of the 5th USENIX Conference on File and Storage Technologies, Feb. 13, 2007, pp. 17-29.
Pitakrat, et al., "A Comparison of Machine Learning Algorithms for Proactive Hard Disk Drive Failure Detection", In Proceedings of the 4th International ACM Sigsoft Symposium on Architecting Critical Systems, Jun. 17, 2013, 10 Pages.
Ryu, et al., "Value-Cognitive Boosting with a Support Vector Machine for Cross-Project Defect Prediction", In Proceedings of Empirical Software Engineering, vol. 21, Issue 1, Feb. 2016, pp. 43-71.

Steen, et al., "microsoftml.rx_fast_trees: Boosted Trees", Retrieved From https://docs.microsoft.com/en-us/machine-learning-server/python-reference/microsoftml/rx-fast-trees, Jul. 15, 2019, 11 Pages.
Sutskever, et al., "Sequence to Sequence Learning with Neural Networks", In Proceedings of the 27th International Conference on Neural Information Processing Systems, Dec. 8, 2014, 9 Pages.
Syer, et al., "Replicating and Re-evaluating the Theory of Relative Defect-Proneness", In Proceedings of Transactions on Software Engineering vol. 41, Issue 2, Feb. 2015, 23 Pages.
Tantithamthavorn, et al., "Automated Parameter Optimization of Classification Techniques for Defect Prediction Models", In Proceeding of IEEE/ACM 38th International Conference on Software Engineering, May 2016, pp. 321-332.
Tantithamthavorn, et al., "Comments on Researcher Bias: The Use of Machine Learning in Software Defect Prediction", In Journal of the IEEE Transactions on Software Engineering, vol. 42, Issue 11, Nov. 1, 2016, pp. 1092-1094.
Tiley, et al., Table of Contents, "Software Testing in the Cloud: Perspectives on an Emerging Discipline". In IGI Global, Jan. 2012, 8 Pages.
Turhan, et al., "On the Relative Value of Cross-Company and Within-Company Data for Defect Prediction", In Proceedings of Empirical Software Engineering, Oct. 2009, 34 Pages.
Vishwanath, et al., "Characterizing Cloud Computing Hardware Reliability", In Proceedings of the 1st ACM Symposium on Cloud Computing, Jun. 10, 2010, pp. 193-203.
Wang, et al., "Automatically Learning Semantic Features for Defect Prediction", In Proceedings of the 38th International Conference on Software Engineering, May 2016, pp. 297-308.
Xu, et al., "Smart Ring: A Model of Node Failure Detection in High Available Cloud Data Center", In Proceedings of 9th IFIP International Conference on Network and Parallel Computing, Sep. 6, 2012, pp. 279-288.
Yang, et al., "A Learning-to-Rank Approach to Software Defect Prediction", In Journal of the IEEE Transactions on Reliability, vol. 64, Issue 1, Mar. 2015, pp. 234-246.
Yang, et al., "Deep Learning for Just-in-Time Defect Prediction", In Proceedings of the IEEE International Conference on Software Quality, Reliability and Security, Aug. 2015, pp. 17-26.
Zhang, Hongyu, "An Investigation of the Relationships between Lines of Code and Defects", In Proceedings of the IEEE International Conference on Software Maintenance, Sep. 2009, pp. 274-283.
Zhang, et al., "Failure Prediction in IBM BlueGene/L event logs", In Proceedings of 22nd IEEE International Symposium on Parallel and Distributed Processing, Apr. 14, 2008, 5 Pages.
Tan, et al. "Online Defect Prediction for Imbalanced Data", In Proceedings of the 37th International Conference on Software Engineering, vol. 2, May 16, 2015, pp. 99-108.
Zhang, Hongyou, "On the Distribution of Software Faults", In Journal of the IEEE Transactions on Software Engineering, vol. 34, Issue 2, Mar. 2008, pp. 301-302.
Zhang, et al., "Towards Building a Universal Defect Prediction Model with Rank Transformed Predictors", In Journal of the Empirical Software Engineering vol. 21, Issue 5, Oct. 2016, 39 Pages.
Communication 94(3) Received for European Application No. 19736536.4, mailed on Apr. 26, 2024, 8 pages.
Lee, et al., "Interpretable Categorization of Heterogeneous Time Series Data", Arxiv.Org, Cornell University Library, 2017, 9 pages.
Nakata, et al., "A modified XCS classifier system for sequence labeling", Proceedings of the 40th Annual Design Automation Conference, 2014, pp. 565-572.
Zheng, et al., "Capturing Feature-Level Irregularity in Disease Progression Modeling", Proceedings of the ACM on Conference on Information and Knowledge Management, 2017, 10 pages.

* cited by examiner

MULTI-PHASE CLOUD SERVICE NODE ERROR PREDICTION BASED ON MINIMIZATION FUNCTION WITH COST RATIO AND FALSE POSITIVE DETECTION

CROSS-REFERENCE TO RELATED APPLICATION

This application is a U.S. National Stage Filing under 35 U.S.C. 371 of International Patent Application Serial No. PCT/CN2018/093775, filed Jun. 29, 2018, and published as WO 2020/000405 A1 on Jan. 2, 2020, which application and publication are incorporated herein by reference in their entirety.

TECHNICAL FIELD

Embodiments described herein generally relate to computing node failure detection and, in some embodiments, more specifically to multi-phase computing node error prediction.

BACKGROUND

Cloud service providers maintain data storage, computing, and networking services for use by entities outside of the service provider organization. The computing infrastructure may include clusters of computing nodes (e.g., physical computing hardware, etc.). The computing nodes may be hypervisors that manage the sharing of physical computing hardware amongst virtual machines (VMs). The data for the VMs may be provisioned on one or more storage device distributed throughout data storage clusters including collections of storage devices. The networking service may include virtual network infrastructure for interconnecting virtual computing devices. A VM may be running on hardware of one or more host computing nodes distributed among the cloud computing infrastructure. With existing approaches, if a computing node hosting the VM experiences an error, the VM may experience an unexpected shutdown or may experience operational problems (e.g., loss of services, slow response times, data loss, errors, etc.). Detection and replacement of computing nodes that are experiencing errors may allow the cloud service provider to migrate the VM to a different computing node to mitigate service disruptions.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
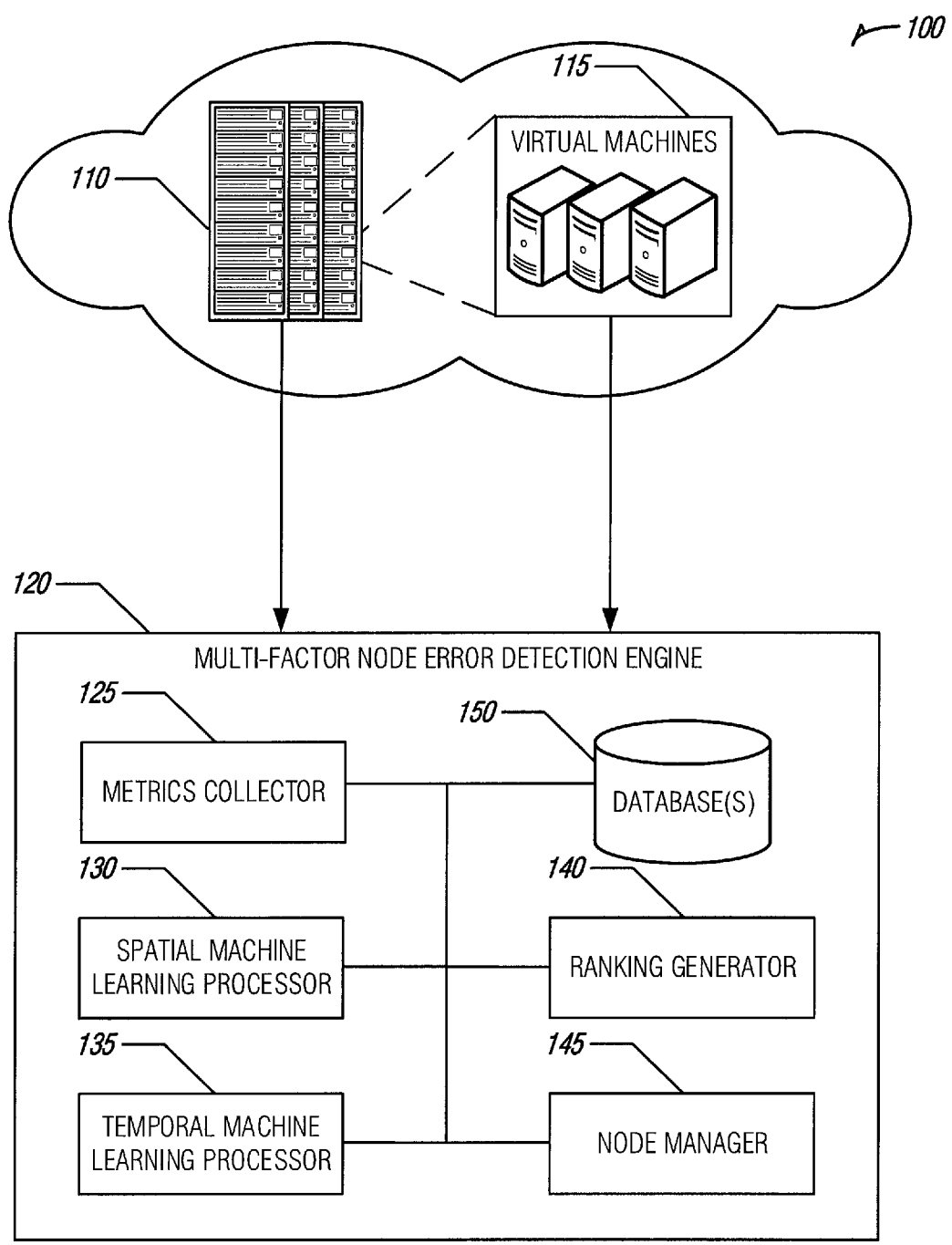
FIG. 1 is a block diagram of an example of an environment and a system for multi-phase cloud service node error prediction, according to an embodiment.

In recent years, many traditional software systems have migrated to cloud computing platforms and are provided as online services. Service quality matters because system failures may seriously impact business and user experience. A cloud service system typically contains a large number of computing nodes. Nodes may fail and impact service availability. The systems and techniques discussed herein may predict the failure-proneness of a node in a cloud service system based on historical data before node failure before a failure condition arises. The ability to predict faulty nodes enables the allocation and migration of virtual machines to the healthy nodes, therefore improving service availability. Predicting node failure in cloud service systems is challenging, because node failure may be caused by a variety of reasons and reflected by many temporal and spatial signals. Furthermore, the failure data is highly imbalanced. To tackle these challenges, a long short-term memory (LSTM) model that incorporates the temporal data is combined with a Random Forest model that incorporates spatial data. A ranking model is used to embed the intermediate results of the two models as feature inputs and ranks the nodes by their failure-proneness. A cost-sensitive function is used to identify the optimal threshold for selecting the faulty nodes.

In recent years, deploying applications and services on large-scale cloud platforms has been widely accepted by the software industry. These cloud service systems provide a variety of services to millions of users around the world every day, therefore high service availability is essential as a small problem may cause serious consequences for users of the cloud service platform. Many service providers have made efforts to maintain high service availability. For example, a cloud service provider may attempt to achieve a "five nines" level of service availability, which represents service availability of 99.999%, allowing at most 26 seconds of down time per month per virtual machine (VM).

Although significant effort has been devoted to service quality assurance, cloud service systems may still encounter many problems and fail to satisfy user requests. These problems are often caused by failures of computing nodes in cloud service systems. A cloud service system typically contains a large number of computing nodes, which supply the processing, network, and storage resources that virtual machine instances use to provide services to users. For example, 8% of all servers may have at least one hardware incident in a given year. Node failure may be a cause of service down time and may account for over 65% of the reliability issues.

Prediction of the failure-proneness of a node in cloud service systems before a failure occurs may help to improve the reliability of a cloud service platform. Machine learning techniques are used to learn the characteristics of historical failure data, build a failure prediction model, and then use the model to predict the likelihood of a node failing in the coming days. The ability to predict faulty nodes may enable cloud service systems to allocate VMs to healthier nodes, therefore reducing the occurrences and duration of VM down time caused by node failures. Furthermore, if a node is predicted as faulty, the cloud service system may perform proactive live migration to migrate the virtual machines from the faulty node to a healthy node without disconnecting the service.

However, building an accurate prediction model for node failure in cloud service systems is challenging. There are three main reasons that building an accurate node failure prediction model may be difficult.

1) There may be complicated failure causes. Due to the complexity of the large-scale cloud system, node failures may be caused by many different software or hardware issues. Examples of these issues may include application bugs, OS crashes, disk failure, a service exception, etc. There is no simple rule/metric that may predict all node failures in a straightforward manner.
2) There may be complex failure-indicating signals. Failures of a node may be indicated by many temporal signals produced by the node locally. They may also be reflected by spatial properties that are shared by nodes that have explicit/implicit dependency among them in different global views of the cloud. Thus, both temporal signals and spatial properties may be analyzed to better capture early failure-indicating signals.
3) There may be highly imbalanced data. Node fault data is highly imbalanced as most of the time the cloud service system has high service availability. For example, a node ratio between failure and healthy classes may be less than 1:1000 (e.g., less than 0.1% nodes contain failures). The highly imbalanced data poses challenges to prediction.

The systems and techniques discussed herein utilize a long short-term memory (LSTM) model that incorporates the temporal data. A Random Forest model is also used that incorporates spatial data. A ranking model to embeds the intermediate results of the two models as feature inputs and ranks the nodes by their failure-proneness. A cost-sensitive function is used to identify the optimal threshold for selecting the faulty nodes. These systems and techniques may address the challenges described above by analyzing both the temporal and spatial signals and using ranking and cost minimization to efficiently identify error-prone nodes for remediation. This approach outperforms the traditional node failure detection approaches that are implemented using conventional classification techniques.

The systems and techniques discussed herein may improve service availability by predicting node failure in cloud service systems. Through failure prediction, intelligent VM allocation and migration may be achieved. The two-phase training model analyze the temporal and spatial features and may be less sensitive to highly imbalanced data. An improvement to recall and precision may outperform traditional approaches built using conventional classifiers. By providing an accurate prediction of which nodes in the cloud computing platform are likely to fail, workloads may be provisioned on healthier nodes or workloads may be migrated from unhealthy nodes to healthy nodes. To minimize the expense (both from processing and monetary standpoint) of migrating workloads from nodes before actual failure, the ranking and costing feature is used to identify migration sources (or non-allocation targets) in numbers that may mimic expected actual failure rates or otherwise minimize the cost of false negative and false positive detection.

FIG. 1 is a block diagram of an example of an environment 100 and a system 120 for multi-phase cloud service node error prediction, according to an embodiment. The environment 100 may include a cloud computing platform 105. The could computing platform 105 may provide storage, computing, and networking services to a variety of external users (e.g., via the internet, wired network, wireless network, cellular network, etc.). The cloud computing platform 105 may include a plurality of computing nodes 110 that may host virtual machines (VMs) 115. The computing nodes 110 and the VMs may be communicatively coupled (e.g., via a wired network, wireless network, cellular network, shared bus, etc.) to the system 120. In an example, the system 120 may be a multi-factor node error detection engine. The system 120 may include a variety of components including a metrics collector 125, a spatial machine learning processor 130, a temporal machine learning processor 135, a ranking generator 140, a node manager 145, and database(s) 150.

Cloud computing has emerged as a new paradigm for delivery of computing as services via the Internet. It offers many service models such as Infrastructure as a Service (IaaS), Platform as a Service (PaaS), and Software as a Service (SaaS). Deploying applications and services on cloud computing platforms (e.g., cloud computing platform 105, etc.) has been widely accepted by software organizations and developers.

The cloud computing platform 105 may contain a large number of physical servers, or nodes 110. For example, the cloud computing platform 105 may include over 1 million servers. The nodes 110 are arranged into racks and a group of racks and may be arranged in physical and virtual clusters. Virtualization is one of the primary technologies used in modern cloud computing to offer better scalability, maintainability, and reliability. A physical node 110 may host multiple VMs 115. The VMs 115 may be backed up, scaled or duplicated, making it easy to meet the requirements of users. When a VM 115 allocation request is sent out, the cloud computing platform 105 will determine (e.g., using the node manager 155, etc.) an appropriate node 110 to host the VM 115. If a node 110 fails, all VMs 115 hosted on the node 110 will experience an outage. The cloud computing platform may support live migration, which refers to the process of moving a running VM 115 between different nodes 110 without disconnecting the client or application. Live migration is a powerful tool for managing cloud services, as it enables rapid movement of workloads within clusters with low impact on running services.

For large-scale software systems such as the cloud computing platform 105, high service availability is crucial. Service availability is a state of a service being accessible to the end user. Usually expressed as a percentage of uptime, it represents the level of operational performance of a system or component for a given period of time. Because the cloud computing platform 105 provides services to hundreds of millions of users around the world, service problems may lead to great revenue loss and user dissatisfaction. Hence, in today's practice, service providers have made every effort to maintain a high service availability, such as "five nines" (e.g., 99.999%), meaning less than 26 seconds down time per month per VM 115 is allowed.

Although tremendous effort has been made to maintain high service availability, there are still many unexpected system problems caused by software or platform failures (e.g., software crashes, network outages, misconfigurations, memory leaks, hardware breakdowns, etc.). These problems become more severe with the ever-increasing scale of the cloud computing platform 105.

Node 110 failure may be one of the most common problems that cause system unavailability in the cloud computing platform 105. If a node 110 fails, all the VMs 115 running on the node 110 will go down, which may impact service availability and cause serious consequences.

Different nodes 110 may fail at different time. Prediction of the failure-proneness of a node 110 based on analysis of historical fault data may allow remediation before the node 110 fails. The ability to predict node 110 failure may help improve service availability by allocating new VMs 115 to healthier nodes 110 and migrate VMs 115 from predicted faulty nodes 110 to predicted healthy nodes 110. Live migration, which is the process of moving a running VM 115 between different nodes 110 without disconnecting the client or application, may be used to proactively migrate VMs 115 from the predicted faulty nodes 110 to the healthy nodes 110. Thus, error-prone nodes 110 may be removed from service before they experience a failure leading to VM 115 downtime.

A prediction model may be built based on historical failure data using machine learning techniques and used to predict the likelihood of a node 110 failing in the near future. The prediction model ranks all nodes 110 by their failure-proneness so that the service systems may allocate VMs 115 to healthier nodes 110. The prediction model also identifies a set of faulty nodes 110 from which hosted VMs 115 should be migrated out. The selection of migration source nodes 110 may take into consideration cost and capacity constraints.

System 120 addresses several technical challenges in designing a failure prediction model for a large-scale cloud computing platform 105 such as, for example, complicated failure causes (e.g., many potential causes (or combinations of causes) leading to node 110 failure), complex failure-indicating signals (e.g., temporal (e.g., node specific signals) and spatial (e.g., environmental signals)), and highly imbalanced data (e.g., small failure ratio resulting in false negatives).

Failures of a single node 110 may be indicated by temporal signals coming from a variety of software or hardware sources of the node 110. Examples of the temporal signals may be performance counters, logs, sensor data, and OS events. The temporal signals may be continuously monitored and may change over time.

In a large-scale cloud system, failures of a node 110 may also be reflected by spatial properties shared by the nodes 110 that are explicitly/implicitly dependent on each other. Dependencies between nodes 110 may include: 1) Resource-based dependency: two nodes 110 may compete for a computing resource (e.g., a router), 2) Location-based dependency: two nodes 110 may co-exist in the same computing segment/domain (such as the same rack), 3) Load balancing based dependency: two nodes 110 may be in the same group for load balancing. The mutually dependent nodes 110 tend to be impacted by a common failure-inducing cause. For example, if a certain portion of nodes 110 fail, other nodes 110 in the same segment may fail in the near future. Therefore, the spatial properties that are shared among the mutually dependent nodes 110 also have predictive power. Examples of the spatial properties may include upgrade domain, shared router, rack location, resource family, load balance group, batch operation group, etc.

Both temporal and spatial data are combined in order to better capture the early failure-indicating signals and build an accurate prediction model. To tackle this challenge, two specific base learners are generated to incorporate temporal and spatial data, respectively. The results from the base learners are used to train a ranking model.

The metrics collector 125 may obtain a set of spatial metrics and a set of temporal metrics for node devices 110 in the cloud computing platform 105. In an example, the set of temporal metrics may be obtained from respective nodes 110 of the cloud computing platform 110. In an example, a node 110 includes a physical computing device that hosts one or more VM 115. In another example, the set of spatial metrics may be obtained from a node controller for respective nodes 110 of the cloud computing platform 105. The temporal metrics and spatial metrics may be stored in the database(s) 150.

Due to the complexity of the cloud computing platform 105, node 110 failures may be caused by many different software or hardware issues. Examples of these issues may include OS crash, application bugs, disk failure, misconfigurations, memory leak, software incompatibility, overheating, service exception, etc. Simple rule-based or threshold-based models are not able to locate the root cause and achieve adequate prediction results. To tackle this challenge, a machine learning based approach to node 110 failure prediction in cloud systems is used.

The spatial machine learning processor 130 may generate a spatial machine learning model using a training set of spatial data from the cloud computing platform 105. The training set of spatial data may include metrics shared by two or more respective node devices 110. In an example, the spatial machine learning model may be generated using random forest training. The spatial machine learning processor 130 may evaluate the node devices 110 using the spatial machine learning model to create a spatial output.

The temporal machine learning processor 135 may generate a temporal machine learning model using a training set of temporal data from the cloud computing platform 105. The training set of temporal data may include metrics individual to respective node devices 110. In an example, the temporal machine learning model is generated using long short-term memory training. The temporal machine learning processor 135 may evaluate the node devices 110 using the temporal machine learning model to create a temporal output.

In a large-scale cloud service platform 105, only one in one thousand nodes 110 may become faulty. The extreme 1-in-1000 imbalanced ratio poses difficulties in training a classification model. Fed with such imbalanced data, a naive classification model may attempt to judge all nodes 110 to be healthy, because in this way, it has the lowest probability of making a wrong guess. Some approaches apply data re-balancing techniques, such as over-sampling and under-sampling techniques, to address this challenge. Such approaches may help raise the recall, but at the same time may introduce a large number of false positives, which may dramatically decrease the precision. To tackle this challenge, a ranking model is generated to rank the nodes 110 by their failure-proneness. Unlike a conventional classification model whose objective is to find a best separation to distinguish all the positive and negative instances, a ranking model focuses on optimizing the top r returned results therefore it is more appropriate in our scenario.

The ranking generator 140 may receive the outputs from the spatial machine learning processor 130 and the temporal machine learning processor 135. The ranking generator 140 may determine one or more potentially faulty nodes based on an evaluation of the spatial output and the temporal output using a ranking model. The one or more potentially faulty nodes may be a subset of the node devices 110.

In an example, the ranking generator 140 may obtain a spatial output vector of trees of the spatial machine learning model and a temporal output vector of a dense layer of temporal machine learning model. The spatial output vector and the temporal output vector may be concatenated to form an input vector for the ranking model. A ranking of the node devices 110 may be generated using the ranking model. The one or more potentially faulty nodes is a subset of the ranked node devices 110.

The node manager 145 may identify one or more migration source nodes from one or more potentially faulty nodes. The one or more migration source nodes are identified by minimizing a cost of false positive and false negative node detection. The node manager 145 may store indications of potentially faulty nodes in the database(s) 150.

In an example, the node manager 145 may work in conjunction with the ranking generator 140 to identify one or more potentially healthy nodes based on the evaluation of the spatial output and the temporal output using the ranking model. The one or more potentially healthy nodes may be a subset of the node devices 110. The node manager 145 may identify one or more migration target nodes (e.g., healthiest nodes, nodes with most available capacity, etc.) from the one or more potentially healthy nodes. The node manager 145 may migrate a VM 115 from a faulty node of the one or more migration source nodes to a healthy node of the one or more migration target nodes.

In another example, the node manager 145 may work in conjunction with the ranking generator 140 to identify one or more potentially healthy nodes based on the evaluation of the spatial output and the temporal output using the ranking model. The one or more potentially healthy nodes may be a subset of the node devices 110. The node manager 145 may identify one or more migration target nodes (e.g., healthiest nodes, nodes with most available capacity, etc.) from the one or more potentially healthy nodes. The node manager 145 may create a new VM 115 on a healthy node of the one or more migration target nodes in lieu of a faulty node of the one or more migration source nodes.

Figure 2:
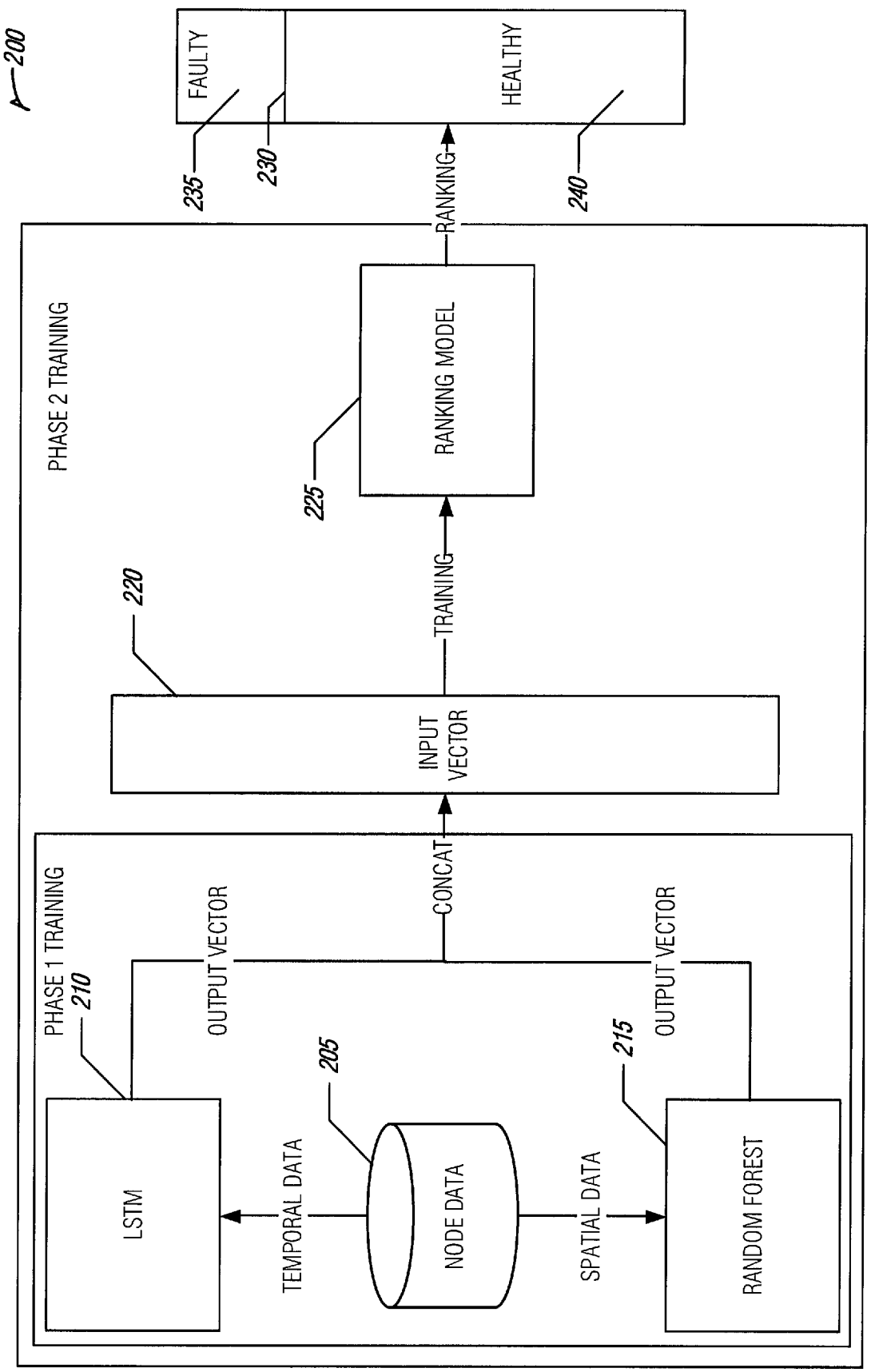
FIG. 2 is a flow diagram that illustrates an example of a process for multi-phase cloud service node error prediction, according to an embodiment.

FIG. 2 is a flow diagram that illustrates an example of a process 200 for multi-phase cloud service node error prediction, according to an embodiment. The process 200 may provide features as described in FIG. 1.

The process 200 shows an overall workflow for multi-phase cloud service error node detection. In an example, there may be two phases of training. In an example phase 1, two base classification models are trained: a LSTM model 210 for temporal data and a Random Forest model 215 for spatial data. In an example, phase 2, the intermediate results of the two base learners are embedded as features and fed as input 220 to a ranking model 225. The ranking model 225 ranks the nodes by their failure-proneness. The top r 230 nodes are identified that minimize the misclassification cost as the predicted faulty nodes 235.

In the example phase 1, base learners are trained on the training data. Heterogeneous data 205 is collected for each node from diverse sources and features are identified from the data. This allows the construction of an effective node failure prediction model. Table 1 shows some examples of features.

TABLE 1

| Feature | Type | Description |
| --- | --- | --- |
| UpgradeDomain | Spatial | The domain where nodes share same upgrade setting. |

TABLE 1-continued

| Feature | Type | Description |
| --- | --- | --- |
| MemoryUsage | Temporal | Memory consumption. |
| DiskSectorError | Temporal | Sector errors in a disk drive. |
| ServiceError | Temporal | Error counts from a deployed service. |
| RackLocation | Spatial | The location of the rack the node belongs to. |
| LoadBalanceGroup | Spatial | The group where nodes' load are balanced. |
| IOResponse | Temporal | I/O Response time. |
| OSBuildGroup | Spatial | The group where nodes have the same OS build. |

These features may be categorized into the following two types:
1) Temporal features, which directly represent a node's local status in time (such as performance counters, JO throughput, resource usage, sensor values, response delays, etc.) or may be aggregated as temporal data from the original sources (such as log event counts, error/exception event counts, system event counts, etc.).
2) Spatial features, which indicate explicit/implicit dependency in global relationships among nodes. Examples of these features include deployment segment, rack location, load balance group, policy group, upgrade domain, etc.

It is known that different machine learning algorithms may work well on some specific feature types and poorly on other feature types. To support specific type of features, feature conversion is performed (e.g., converting categorical features into numeric values), which may incur information loss. To allow for evaluation of different features types, a separate learner is built for each type of data (e.g., temporal and spatial).

For temporal features, a Long Short-Term Memory (LSTM) learner 210 is used to generate a temporal machine learning model. LSTM is a widely adopted deep neural network (DNN) model. It may balance between retaining the previous state and memorizing new information. LSTM may better capture the patterns behind the time-series data and has proven to be successful in solving tasks such as machine translation and speech recognition.

Figure 3:
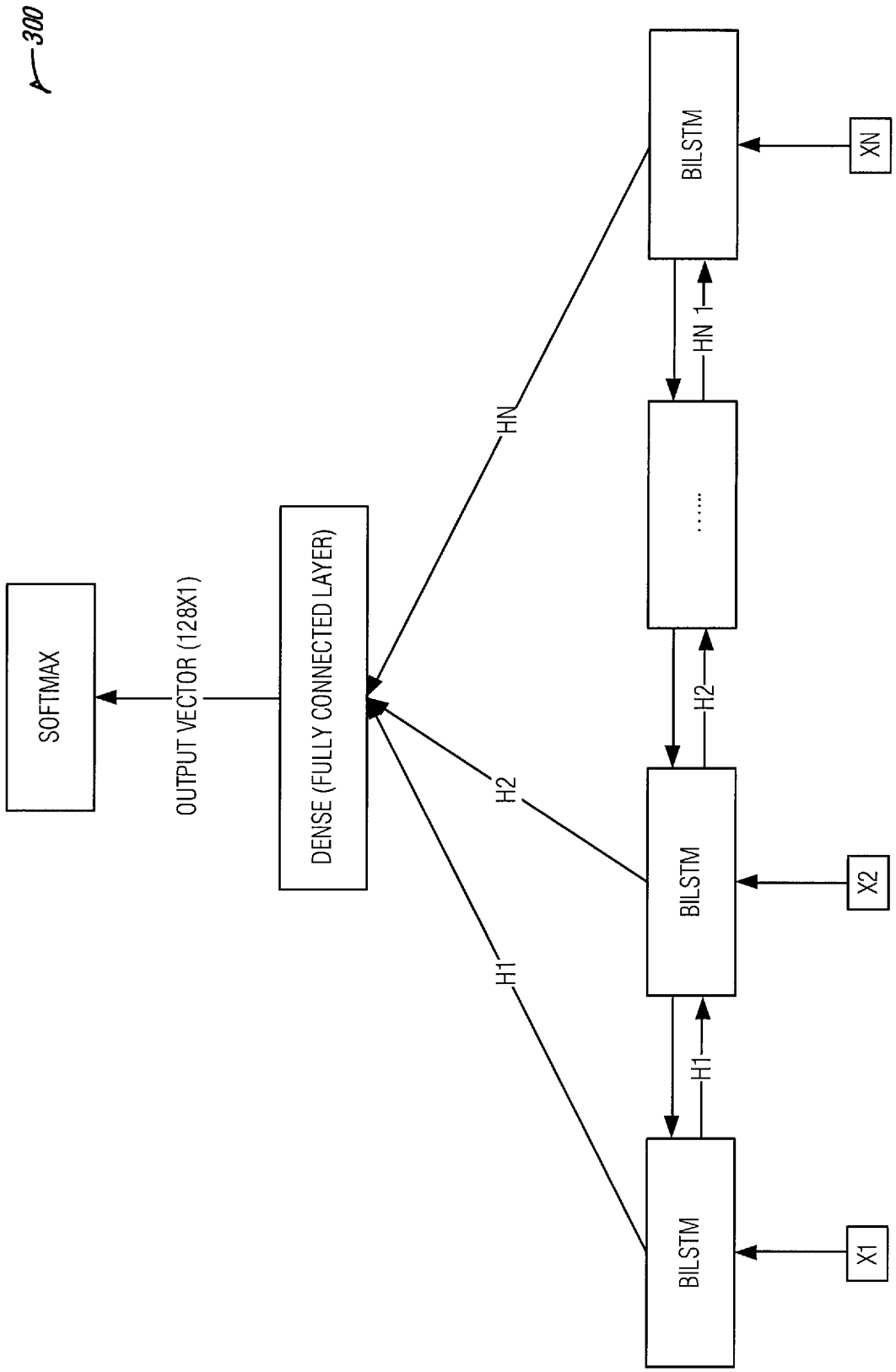
FIG. 3 is a flow diagram that illustrates an example of a process for training a long short-term memory model for multi-phase cloud service node error prediction, according to an embodiment.

FIG. 3 is a flow diagram that illustrates an example of a process 300 for training a long short-term memory model for multi-phase cloud service node error prediction, according to an embodiment. The process 300 may provide features as described in FIGS. 1 and 2. The process 300 illustrates the training of the LSTM model. Bi-directional LSTM is used for the time series data x1, x2, . . . , xn, where xi is the input vector of all temporal features at time i. The LSTM layer produces the representation sequence h1, h2, . . . , hn, which is fed to a dense layer (e.g., fully connected layer). In an example, the output of the dense layer may be a 128×1 vector Vt. The vector is fed to a softmax function, which is the final layer of a DNN-based classifier.

Returning to the description of FIG. 2, for spatial features, a Random Forest learner 215 is used to generate a spatial machine learning model. Random Forest is one of the most widely used classification methods. It builds a multitude of decision trees at training time and outputs the class of the voting result from the individual trees. Random Forest splits the trees based on the information gain, therefore it may better reflect the impact of discrete values.

Figure 4:
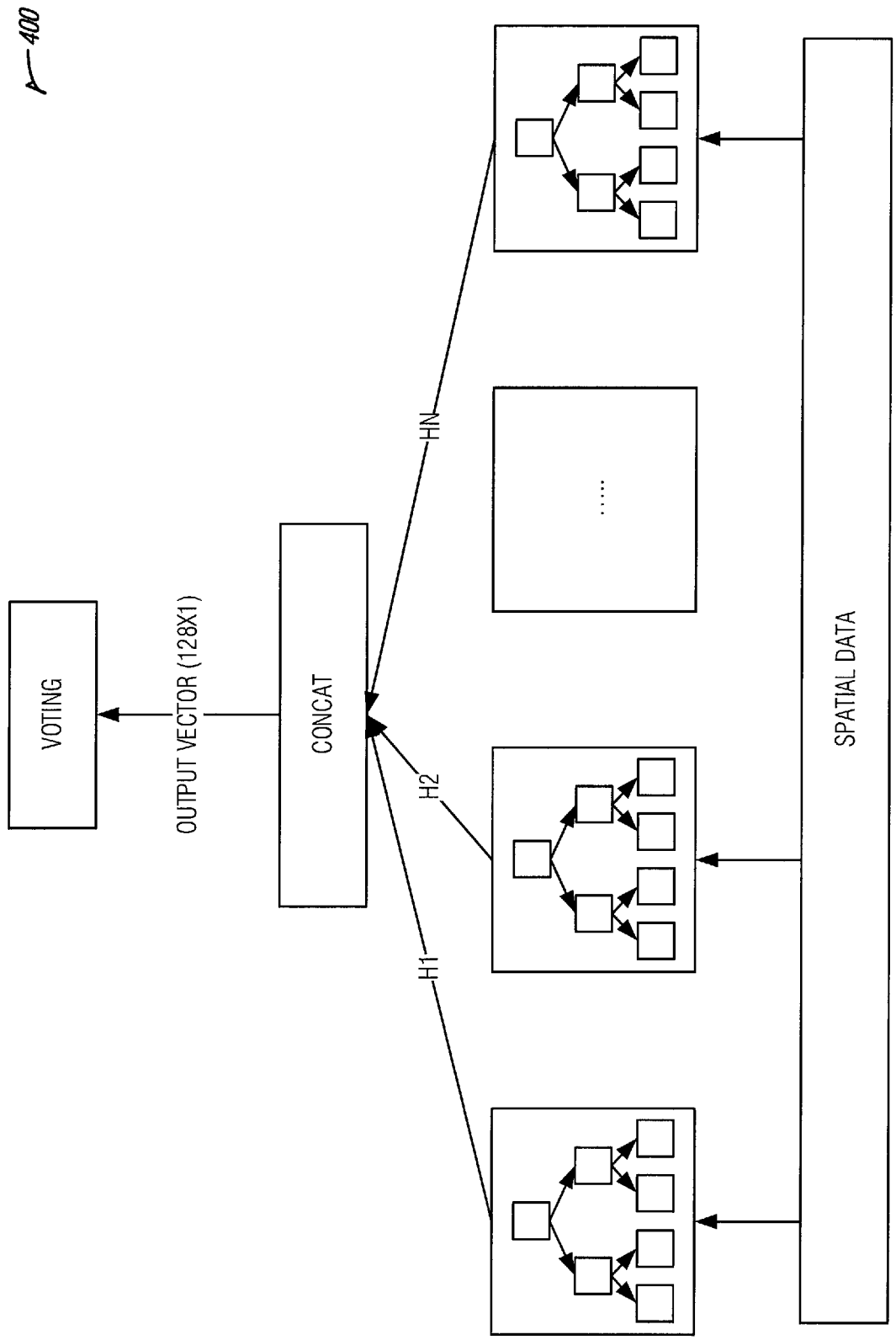
FIG. 4 is a flow diagram that illustrates an example of a process for training a random forest model for multi-phase cloud service node error prediction, according to an embodiment.

FIG. 4 is a flow diagram that illustrates an example of a process 400 for training a random forest model for multi-phase cloud service node error prediction, according to an embodiment. The process 400 may provide features as described in FIGS. 1 and 2. The process 400 illustrates training of the Random Forest model. Given the spatial data, an ensemble of trees (e.g., 128 trees, etc.) are trained. The results h1, h2, . . . , hn are concatenated into a vector Vs and fed to a majority voting module, producing the final classification result.

Returning to the description of FIG. 2, in the example phase 2 training, a prediction model is constructed to predict the failure-proneness of nodes in the near future. Different nodes have different likelihood of failing. In this step, the prediction problem is formulated as a ranking problem. That is, instead of simply telling whether a node is faulty or not, the nodes are ranked by their probability of being faulty. By giving relative order as opposed to a binary label, the results of a ranking algorithm may distinguish between different degrees of failure-proneness. The ranking results better serve the goal of VM allocation (e.g., allocating a VM to a healthier node) and on-demand live migration (e.g., migrating a VM from a faulty node to a healthier nodes). Furthermore, as the ranking approach is effective in optimizing the top r 230 results, it may work better in the case of highly imbalanced data.

In the example phase 2, the intermediate output vectors produced by the base learners are used as the input vector 220 to the ranking model 225. More specifically, from the LSTM model 210, the output vector Vt of the Dense layer is used. From the Random Forest model 215, the output vector Vs produced by the trees is used. The two output vectors are concatenated and form an input vector V (e.g., 256×1) 220 for the ranking model 225.

To train a ranking model 225, the historical failure data about the nodes is obtained. The nodes are ranked according to the frequency and duration of failures. Learning to Rank may be used, which automatically train an optimized ranking model to minimize the cost of disorder, especially the cost for the top results (e.g., similar to the optimization of the top results in a search engine). For example, LambdaMART may be used. LambdaMART is a boosted tree version of a learning-to-rank algorithm.

To improve service availability, VMs are intelligently allocated to the healthier nodes so that these VMs are less likely to suffer from node failures in near future. In an example, VMs may be proactively migrated to healthy nodes 240 using live migration if they reside on high-risk nodes. Cost-sensitive thresholding is used to identify the faulty nodes 235 for live migration.

As most of the nodes are healthy and only a small percentage of nodes are faulty, the top r 230 nodes returned by the ranking model are selected as the faulty ones 235. The optimal top r 230 nodes are selected with historical data to minimize the total misclassification cost: r=arg min (CostRatio*$FP_r$+$FN_r$), r where FPr and FNr are the number of false positives and false negatives in the top r 230 predicted results, respectively. Cost1 is denoted as the cost of failing to identify a faulty node 235 (e.g., false negatives). Cost2 is denoted as the cost of wrongly identifying a healthy node 240 as a faulty node 235 (e.g., false positives), which involves the cost of unnecessary live migration from the "faulty" node 235 to a healthy node 240. We define CostRatio as a ratio Cost2/Cost1. In an example, the value of CostRatio may be estimated by experts in product teams of the cloud computing service provider. In an example, due to the concerns about cost and capacity, CostRatio may be set to 2 (e.g., precision may be valued more than recall). The optimum r 230 value is determined by minimizing the total misclassification cost with historical data. The top r 230 nodes are predicted faulty nodes 235. They are high risk nodes and the VMs hosted on them may be migrated to healthy nodes 240.

Figure 5:
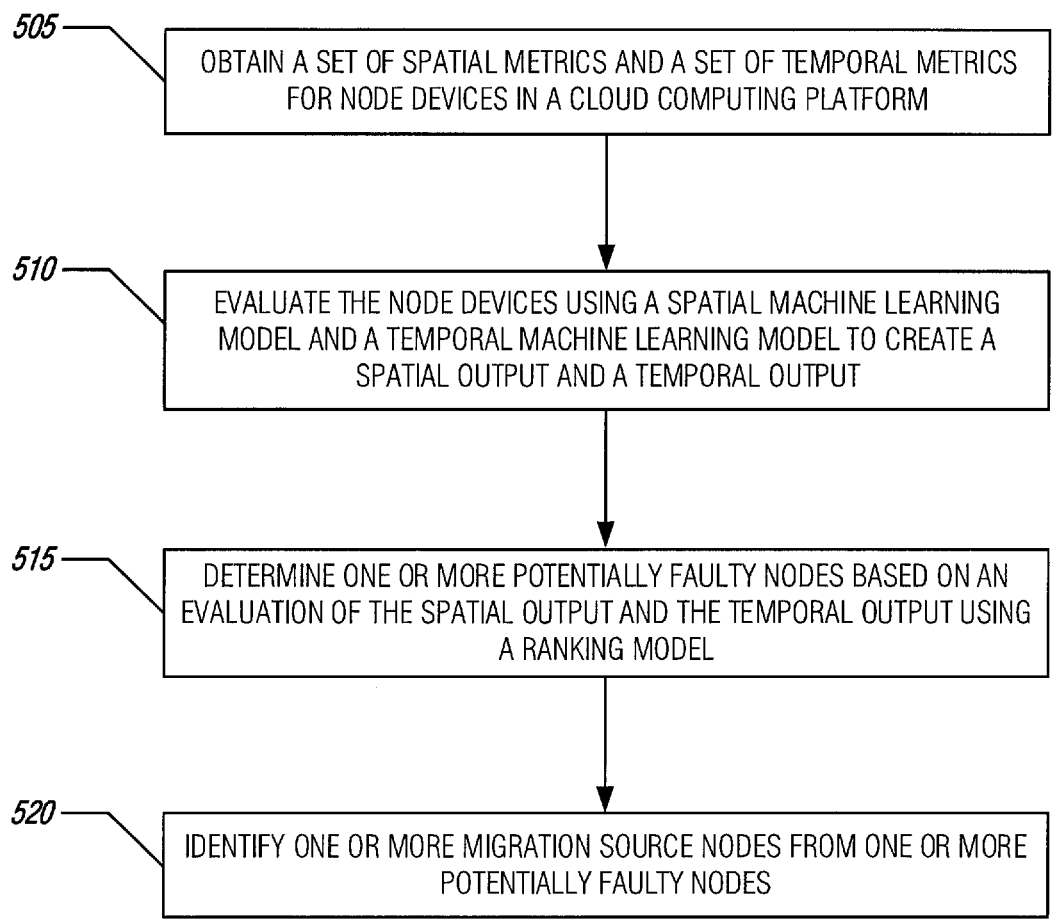
FIG. 5 is a flowchart that illustrates an example of a method for multi-phase cloud service node error prediction, according to an embodiment.

FIG. 5 is a flow chart that illustrates an example of a method 500 for multi-phase cloud service node error prediction, according to an embodiment. The method 500 may provide features as described in FIGS. 1-4.

A set of spatial metrics and a set of temporal metrics may be obtained (e.g., by the metrics collector 125 as described in FIG. 1) for node devices in a cloud computing platform (e.g., at operation 505). In an example, the set of temporal metrics may be obtained from respective nodes of the cloud computing platform. A node may include a physical computing device that hosts one or more virtual machine (VM). In another example, the set of spatial metrics are obtained from a node controller for respective nodes of the cloud computing platform.

The node devices may be evaluated using a spatial machine learning model (e.g., by the spatial machine learning processor 130 as described in FIG. 1) and a temporal machine learning model (e.g., by the temporal machine learning processor 135 as described in FIG. 1) to create a spatial output and a temporal output (e.g., at operation 510). In an example, the spatial machine learning model may be generated using random forest training. In an example, the spatial machine learning model may be generated using a training set of spatial metrics. The training set of spatial metrics may include metrics shared by two or more respective node devices. In another example, the temporal machine learning model may be generated using long short-term memory training. In an example, the temporal machine learning model may be generated using a training set of temporal metrics. The training set of temporal metrics may include metrics individual to respective node devices.

One or more potentially faulty nodes may be determined (e.g., by the ranking engine 140 as described in FIG. 1) based on an evaluation of the spatial output and the temporal output using a ranking model (e.g., at operation 515). The one or more potentially faulty nodes may be a subset of the node devices. In an example, a spatial output vector of trees of the spatial machine learning model may be obtained. A temporal output vector of a dense layer of the temporal machine learning model may be obtained. The spatial output vector and the temporal output vector may be concatenated to form an input vector for the ranking model. A ranking of the node devices may be generated using the ranking model. The one or more potentially faulty nodes may be a subset of the ranked node devices.

One or more migration source nodes may be identified (e.g., by the node manager 145 as described in FIG. 1) from one or more potentially faulty nodes (e.g., at operation 520). The one or more migration source nodes may be identified by minimization of a cost of false positive and false negative node detection.

In an example, one or more potentially healthy nodes may be identified based on the evaluation of the spatial output and the temporal output using the ranking model. The one or more potentially healthy nodes may be a subset of the node devices. One or more migration target nodes may be identified from the one or more potentially healthy nodes. A VM may be migrated from a faulty node of the one or more migration source nodes to a healthy node of the one or more migration target nodes.

In another example, one or more potentially healthy nodes may be identified based on the evaluation of the spatial output and the temporal output using the ranking model. The one or more potentially healthy nodes may be a subset of the node devices. One or more migration target nodes may be identified from the one or more potentially healthy nodes. A new VM may be created on a healthy node of the one or more migration target nodes in lieu of a faulty node of the one or more migration source nodes.

Figure 6:
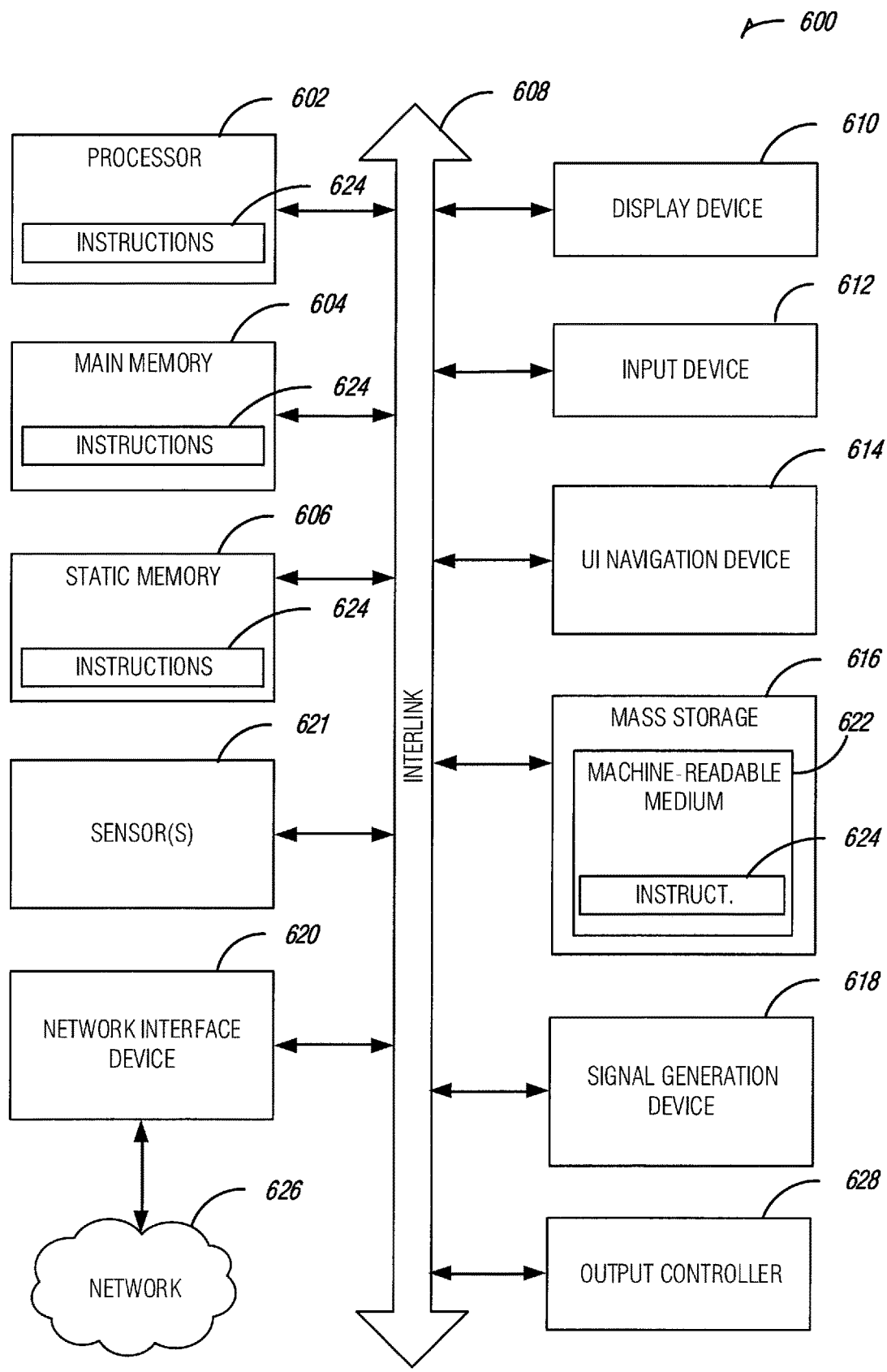
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensors. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine readable media). Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, $3^{rd}$ Generation Partnership Project (3GPP) standards for 4G and 5G wireless communication including: 3GPP Long- Term evolution (LTE) family of standards, 3GPP LTE Advanced family of standards, 3GPP LTE Advanced Pro family of standards, 3GPP New Radio (NR) family of standards, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Example 1 is a system for predicting node failure, the system comprising: at least one processor; and memory including instructions that, when executed by the at least one processor, cause the at least one processor to perform operations to: obtain a set of spatial metrics and a set of temporal metrics for node devices in a cloud computing platform; evaluate the node devices using a spatial machine learning model and a temporal machine learning model to create a spatial output and a temporal output; determine one or more potentially faulty nodes based on an evaluation of the spatial output and the temporal output using a ranking model, wherein the one or more potentially faulty nodes is a subset of the node devices; and identify one or more migration source nodes from one or more potentially faulty nodes, wherein the one or more migration source nodes are identified by minimization of a cost of false positive and false negative node detection.

In Example 2, the subject matter of Example 1 includes, wherein the memory further includes instructions to generate the spatial machine learning model using random forest training.

In Example 3, the subject matter of Examples 1-2 includes, wherein memory further includes instructions to generate the temporal machine learning model using long short-term memory training.

In Example 4, the subject matter of Examples 1-3 includes, wherein the instructions to determine the one or more potentially faulty nodes further includes instructions to: obtain a spatial output vector of trees of the spatial machine learning model; obtain a temporal output vector of a dense layer of the temporal machine learning model; concatenate the spatial output vector and the temporal output vector to form an input vector for the ranking model; and generate a ranking of the node devices using the ranking model, wherein the one or more potentially faulty nodes is a subset of the ranked node devices.

In Example 5, the subject matter of Examples 1-4 includes, wherein the set of temporal metrics are obtained from respective nodes of the cloud computing platform, wherein a node includes a physical computing device that hosts one or more virtual machine (VM).

In Example 6, the subject matter of Examples 1-5 includes, wherein the set of spatial metrics are obtained from a node controller for respective nodes of the cloud computing platform.

In Example 7, the subject matter of Examples 1-6 includes, wherein the spatial machine learning model is generated using a training set of spatial metrics, and wherein the training set of spatial metrics include metrics shared by two or more respective node devices.

In Example 8, the subject matter of Examples 1-7 includes, wherein the temporal machine learning model is generated using a training set of temporal metrics, and wherein the training set of temporal metrics include metrics individual to respective node devices.

In Example 9, the subject matter of Examples 1-8 includes, the memory further including instructions to: identify one or more potentially healthy nodes based on the evaluation of the spatial output and the temporal output using the ranking model, wherein the one or more potentially healthy nodes is a subset of the node devices; identify one or more migration target nodes from the one or more potentially healthy nodes; and migrate a virtual machine (VM) from a faulty node of the one or more migration source nodes to a healthy node of the one or more migration target nodes.

In Example 10, the subject matter of Examples 1-9 includes, the memory further including instructions to: identify one or more potentially healthy nodes based on the evaluation of the spatial output and the temporal output using the ranking model, wherein the one or more potentially healthy nodes is a subset of the node devices; identify one or more migration target nodes from the one or more potentially healthy nodes; and create a new virtual machine (VM) on a healthy node of the one or more migration target nodes in lieu of a faulty node of the one or more migration source nodes.

Example 11 is at least one machine readable storage medium including instructions for predicting node failure that, when executed by at least one processor, cause the at least one processor to perform operations to: obtain a set of spatial metrics and a set of temporal metrics for node devices in a cloud computing platform; evaluate the node devices using a spatial machine learning model and a temporal machine learning model to create a spatial output and a temporal output; determine one or more potentially faulty nodes based on an evaluation of the spatial output and the temporal output using a ranking model, wherein the one or more potentially faulty nodes is a subset of the node devices; and identify one or more migration source nodes from one or more potentially faulty nodes, wherein the one or more migration source nodes are identified by minimization of a cost of false positive and false negative node detection.

In Example 12, the subject matter of Example 11 includes, wherein the spatial machine learning model is generated using random forest training.

In Example 13, the subject matter of Examples 11-12 includes, wherein the temporal machine learning model is generated using long short-term memory training.

In Example 14, the subject matter of Examples 11-13 includes, wherein the instructions to determine the one or more potentially faulty nodes further includes instructions to: obtain a spatial output vector of trees of the spatial machine learning model; obtain a temporal output vector of a dense layer of the temporal machine learning model; concatenate the spatial output vector and the temporal output vector to form an input vector for the ranking model; and generate a ranking of the node devices using the ranking model, wherein the one or more potentially faulty nodes is a subset of the ranked node devices.

In Example 15, the subject matter of Examples 11-14 includes, wherein the set of temporal metrics are obtained from respective nodes of the cloud computing platform, wherein a node includes a physical computing device that hosts one or more virtual machine (VM).

In Example 16, the subject matter of Examples 11-15 includes, wherein the set of spatial metrics are obtained from a node controller for respective nodes of the cloud computing platform.

In Example 17, the subject matter of Examples 11-16 includes, wherein the spatial machine learning model is generated using a training set of spatial metrics, and wherein the training set of spatial metrics include metrics shared by two or more respective node devices.

In Example 18, the subject matter of Examples 11-17 includes, wherein the temporal machine learning model is generated using a training set of temporal metrics, and wherein the training set of temporal metrics include metrics individual to respective node devices.

In Example 19, the subject matter of Examples 11-18 includes, the memory further including instructions to: identify one or more potentially healthy nodes based on the evaluation of the spatial output and the temporal output using the ranking model, wherein the one or more potentially healthy nodes is a subset of the node devices; identify one or more migration target nodes from the one or more potentially healthy nodes; and migrate a virtual machine (VM) from a faulty node of the one or more migration source nodes to a healthy node of the one or more migration target nodes.

In Example 20, the subject matter of Examples 11-19 includes, the memory further including instructions to: identify one or more potentially healthy nodes based on the evaluation of the spatial output and the temporal output using the ranking model, wherein the one or more potentially healthy nodes is a subset of the node devices; identify one or more migration target nodes from the one or more potentially healthy nodes; and create a new virtual machine (VM) on a healthy node of the one or more migration target nodes in lieu of a faulty node of the one or more migration source nodes.

Example 21 is a method for predicting node failure, the method comprising: obtaining a set of spatial metrics and a set of temporal metrics for node devices in a cloud computing platform; evaluating the node devices using a spatial machine learning model and a temporal machine learning model to create a spatial output and a temporal output; determining one or more potentially faulty nodes based on an evaluation of the spatial output and the temporal output using a ranking model, wherein the one or more potentially faulty nodes is a subset of the node devices; and identifying one or more migration source nodes from one or more potentially faulty nodes, wherein the one or more migration source nodes are identified by minimizing a cost of false positive and false negative node detection.

In Example 22, the subject matter of Example 21 includes, wherein the spatial machine learning model is generated using random forest training.

In Example 23, the subject matter of Examples 21-22 includes, wherein the temporal machine learning model is generated using long short-term memory training.

In Example 24, the subject matter of Examples 21-23 includes, wherein determining the one or more potentially faulty nodes further comprises:
  obtaining a spatial output vector of trees of the spatial machine learning model;
  obtaining a temporal output vector of a dense layer of the temporal machine learning model; concatenating the spatial output vector and the temporal output vector to form an input vector for the ranking model; and generating a ranking of the node devices using the ranking model, wherein the one or more potentially faulty nodes is a subset of the ranked node devices.

In Example 25, the subject matter of Examples 21-24 includes, wherein the set of temporal metrics are obtained from respective nodes of the cloud computing platform, wherein a node includes a physical computing device that hosts one or more virtual machine (VM).

In Example 26, the subject matter of Examples 21-25 includes, wherein the set of spatial metrics are obtained from a node controller for respective nodes of the cloud computing platform.

In Example 27, the subject matter of Examples 21-26 includes, wherein the spatial machine learning model is generated using a training set of spatial metrics, and wherein the training set of spatial metrics include metrics shared by two or more respective node devices.

In Example 28, the subject matter of Examples 21-27 includes, wherein the temporal machine learning model is generated using a training set of temporal metrics, and wherein the training set of temporal metrics include metrics individual to respective node devices.

In Example 29, the subject matter of Examples 21-28 includes, identifying one or more potentially healthy nodes based on the evaluation of the spatial output and the temporal output using the ranking model, wherein the one or more potentially healthy nodes is a subset of the node devices; identifying one or more migration target nodes from the one or more potentially healthy nodes; and migrating a virtual machine (VM) from a faulty node of the one or more migration source nodes to a healthy node of the one or more migration target nodes.

In Example 30, the subject matter of Examples 21-29 includes, identifying one or more potentially healthy nodes based on the evaluation of the spatial output and the temporal output using the ranking model, wherein the one or more potentially healthy nodes is a subset of the node devices; identifying one or more migration target nodes from the one or more potentially healthy nodes; and creating a new virtual machine (VM) on a healthy node of the one or more migration target nodes in lieu of a faulty node of the one or more migration source nodes.

Example 31 is a system comprising means to perform any method of Examples 21-30.

Example 32 is at least one machine readable medium including instructions that, when executed by a machine, cause the machine to perform any method of Examples 21-30.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for predicting computing node failure in a cloud computing platform, the system comprising:
    at least one processor; and
    memory including instructions that, when executed by the at least one processor, cause the at least one processor to perform operations to:
        obtain a set of spatial metrics and a set of temporal metrics for computing node devices in the cloud computing platform, the set of spatial metrics comprising spatial signals from hardware and software components shared by the computing node devices, and the set of temporal metrics comprising temporal signals from hardware and software components for each computing node device of the computing node devices;
        evaluate the computing node devices using a spatial machine learning model and the set of spatial metrics and using a temporal machine learning model and the set of temporal metrics to create a spatial output and a temporal output for each computing node device of the computing node devices;
        determine one or more potentially faulty computing node devices based on an evaluation of the spatial output and the temporal output using a ranking model, wherein the one or more potentially faulty computing node devices is a subset of the computing node devices;
        identify one or more migration source computing node devices from the one or more potentially faulty computing node devices, wherein a number of computing node devices included in the one or more migration source computing node devices are determined using a threshold calculated by applying a minimization function to a cost ratio and a predicted number of false positive detections included in the one or more potentially faulty computing node devices and a predicted number of false negative detections excluded from the one or more potentially faulty computing node devices, the cost ratio representing a ratio between a historical cost of false positive detection and a historical cost of false negative detection;
        identify one or more migration target computing node devices from one or more potentially healthy computing node devices; and
        migrate a virtual machine (VM) from a faulty computing node device of the one or more migration source computing node devices to a healthy computing node device of the one or more migration target computing node devices.

2. The system of claim 1, wherein the memory further includes instructions to generate the spatial machine learning model using random forest training.

3. The system of claim 1, wherein memory further includes instructions to generate the temporal machine learning model using long short-term memory training.

4. The system of claim 1, wherein the instructions to determine the one or more potentially faulty computing node devices further includes instructions to:
    obtain a spatial output vector of trees of the spatial machine learning model;
    obtain a temporal output vector of a dense layer of the temporal machine learning model;
    concatenate the spatial output vector and the temporal output vector to form an input vector for the ranking model; and
    generate a ranking of the computing node devices using the ranking model, wherein the one or more potentially faulty computing node devices is a subset of the ranked computing node devices.

5. The system of claim 1, wherein the set of temporal metrics are obtained from respective computing node devices of the cloud computing platform, wherein a computing node device includes a physical computing device that hosts one or more virtual machines (VMs).

6. The system of claim 1, wherein the set of spatial metrics are obtained from a node controller for respective computing node devices of the cloud computing platform.

7. The system of claim 1, wherein the spatial machine learning model is generated using a training set of spatial metrics, and wherein the training set of spatial metrics include metrics shared by two or more respective computing node devices.

8. The system of claim 1, wherein the temporal machine learning model is generated using a training set of temporal metrics, and wherein the training set of temporal metrics include metrics individual to respective computing node devices.

9. The system of claim 1, the memory further including instructions to:
   identify the one or more potentially healthy computing node devices based on the evaluation of the spatial output and the temporal output using the ranking model, wherein the one or more potentially healthy computing node devices is a subset of the computing node devices.

10. The system of claim 1, the memory further including instructions to:
    identify the one or more potentially healthy computing node devices based on the evaluation of the spatial output and the temporal output using the ranking model, wherein the one or more potentially healthy computing node devices is a subset of the computing node devices;
    identify the one or more migration target computing node devices from the one or more potentially healthy computing node devices; and
    create a new virtual machine (VM) on a healthy computing node device of the one or more migration target computing node devices in lieu of a faulty node of the one or more migration source computing node devices.

11. A method for predicting computing node failure in a cloud computing platform, the method comprising:
    obtaining a set of spatial metrics and a set of temporal metrics for computing node devices in the cloud computing platform, the set of spatial metrics comprising spatial signals from hardware and software components shared by the computing node devices, and the set of temporal metrics comprising temporal signals from hardware and software components for each computing node device of the computing node devices;
    evaluating the computing node devices using a spatial machine learning model and the set of spatial metrics and using a temporal machine learning model and the set of temporal metrics to create a spatial output and a temporal output for each computing node device of the computing node devices;
    determining one or more potentially faulty computing node devices based on an evaluation of the spatial output and the temporal output using a ranking model, wherein the one or more potentially faulty computing node devices is a subset of the computing node devices;
    identifying one or more migration source computing node devices from the one or more potentially faulty computing node devices, wherein a number of computing node devices included in the one or more migration source computing node devices are determined using a threshold calculated by applying a minimization function to a cost ratio and a predicted number of false positive detections included in the one or more potentially faulty computing node devices and a predicted number of false negative detections excluded from the one or more potentially faulty computing node devices, the cost ratio representing a ratio between a historical cost of false positive detection and a historical cost of false negative detection;
    identifying one or more migration target computing node devices from one or more potentially healthy computing node devices; and
    migrating a virtual machine (VM) from a faulty computing node device of the one or more migration source computing node devices to a healthy computing node device of the one or more migration target computing node devices.

12. The method of claim 11, wherein determining the one or more potentially faulty computing node devices further comprises:
    obtaining a spatial output vector of trees of the spatial machine learning model;
    obtaining a temporal output vector of a dense layer of the temporal machine learning model;
    concatenating the spatial output vector and the temporal output vector to form an input vector for the ranking model; and
    generating a ranking of the computing node devices using the ranking model, wherein the one or more potentially faulty computing node devices is a subset of the ranked computing node devices.

13. The method of claim 11, wherein the spatial machine learning model is generated using a training set of spatial metrics, and wherein the training set of spatial metrics include metrics shared by two or more respective computing node devices.

14. The method of claim 11, further comprising:
    identifying the one or more potentially healthy computing node devices based on the evaluation of the spatial output and the temporal output using the ranking model, wherein the one or more potentially healthy computing node devices is a subset of the computing node devices.

15. The method of claim 11, further comprising:
    identifying the one or more potentially healthy computing node devices based on the evaluation of the spatial output and the temporal output using the ranking model, wherein the one or more potentially healthy computing node devices is a subset of the computing node devices;
    identifying the one or more migration target computing node devices from the one or more potentially healthy computing node devices; and
    creating a new virtual machine (VM) on a healthy computing node device of the one or more migration target computing node devices in lieu of a faulty computing node device of the one or more migration source computing node devices.

16. At least one non-transitory machine-readable medium comprising instructions for predicting computing node failure in a cloud computing platform that, when executed by at least one processor, cause the at least one processor to perform operations to:
    obtain a set of spatial metrics and a set of temporal metrics for computing node devices in the cloud computing platform, the set of spatial metrics comprising spatial signals from hardware and software components shared by the computing node devices, and the set of temporal metrics comprising temporal signals from hardware and software components for each computing node device of the computing node devices;
    evaluate the computing node devices using a spatial machine learning model and the set of spatial metrics and using a temporal machine learning model and the set of temporal metrics to create a spatial output and a temporal output for each computing node device of the computing node devices;

determine one or more potentially faulty computing node devices based on an evaluation of the spatial output and the temporal output using a ranking model, wherein the one or more potentially faulty computing node devices is a subset of the computing node devices;

identify one or more migration source computing node devices from the one or more potentially faulty computing node devices, wherein a number of computing node devices included in the one or more migration source computing node devices are determined using a threshold calculated by applying a minimization function to a cost ratio and a predicted number of false positive detections included in the one or more potentially faulty computing node devices and a predicted number of false negative detections excluded from the one or more potentially faulty computing node devices, the cost ratio representing a ratio between a historical cost of false positive detection and a historical cost of false negative detection;

identify one or more migration target computing node devices from one or more potentially healthy computing node devices; and migrate a virtual machine (VM) from a faulty computing node device of the one or more migration source computing node devices to a healthy computing node device of the one or more migration target computing node devices.

17. The at least one non-transitory machine-readable medium of claim 16, further comprising instructions to generate the spatial machine learning model using random forest training.

18. The at least one non-transitory machine-readable medium of claim 16, further comprising instructions to generate the temporal machine learning model using long short-term memory training.

19. The at least one non-transitory machine-readable medium of claim 16, wherein the instructions to determine the one or more potentially faulty computing node devices further includes instructions to:
- obtain a spatial output vector of trees of the spatial machine learning model;
- obtain a temporal output vector of a dense layer of the temporal machine learning model;
- concatenate the spatial output vector and the temporal output vector to form an input vector for the ranking model; and
- generate a ranking of the computing node devices using the ranking model, wherein the one or more potentially faulty computing node devices is a subset of the ranked computing node devices.

20. The at least one non-transitory machine-readable medium of claim 16, wherein the set of temporal metrics are obtained from respective computing nodes of the cloud computing platform, wherein a node includes a physical computing device that hosts one or more virtual machines (VMs).

* * * * *